US012391532B2

(12) United States Patent
Ronchi

(10) Patent No.: US 12,391,532 B2
(45) Date of Patent: Aug. 19, 2025

(54) APPARATUS AND METHOD FOR FILLING CONTAINERS ARRANGED IN-LINE WITH COLLECTION OF THE FLUIDS FOR WASHING THE SUPPLY DUCTS AND THE FILLING HEADS

(71) Applicant: RONCHI MARIO S.P.A., Gessate (IT)

(72) Inventor: Cesare Ronchi, Gessate (IT)

(73) Assignee: RONCHI MARIO S.P.A., Gessate (IT)

( * ) Notice: Subject to any disclaimer, the term of this patent is extended or adjusted under 35 U.S.C. 154(b) by 91 days.

(21) Appl. No.: 18/284,677

(22) PCT Filed: Apr. 4, 2022

(86) PCT No.: PCT/IB2022/053099
§ 371 (c)(1),
(2) Date: Sep. 28, 2023

(87) PCT Pub. No.: WO2022/214931
PCT Pub. Date: Oct. 13, 2022

(65) Prior Publication Data
US 2024/0182287 A1 Jun. 6, 2024

(30) Foreign Application Priority Data
Apr. 6, 2021 (IT) ........................ 102021000008471

(51) Int. Cl.
*B67C 3/26* (2006.01)
*B67C 3/00* (2006.01)
*B67C 7/00* (2006.01)

(52) U.S. Cl.
CPC ................ *B67C 3/004* (2013.01); *B67C 3/26* (2013.01); *B67C 7/0026* (2013.01)

(58) Field of Classification Search
CPC ......... B67C 3/001; B67C 3/002; B67C 3/004; B67C 3/26; B67C 7/00; B67C 7/0026
See application file for complete search history.

(56) References Cited

U.S. PATENT DOCUMENTS 4,024,896 A * 5/1977 Ishioka .................. B67C 3/004 141/90
5,579,791 A * 12/1996 Beswick ................ B08B 9/205 134/129
5,673,535 A * 10/1997 Jagger .................. B65B 55/027 198/803.14
6,199,350 B1 * 3/2001 Brechel ................ B65B 7/2821 53/308
6,666,071 B1 * 12/2003 McCormick ........ G01M 3/3236 73/41
7,513,279 B2 * 4/2009 Bernhard ............... B67C 3/004 141/147
8,944,121 B2 * 2/2015 Huitorel ................ B67C 3/004 141/90

(Continued)

FOREIGN PATENT DOCUMENTS

WO WO-2022214933 A1 * 10/2022 ............... B65B 3/04

*Primary Examiner* — Nicolas A Arnett

(57) ABSTRACT

An apparatus for filling containers comprises a filling station, with a plurality of filling heads which are supplied by supply ducts supplying a filling fluid and are each provided with a dispensing nozzle. The apparatus has a number of collection cups for collecting washing fluids for washing the filling heads and the supply ducts, equal to the number of said filling heads.

28 Claims, 5 Drawing Sheets

(56) References Cited

U.S. PATENT DOCUMENTS

Figure 1:
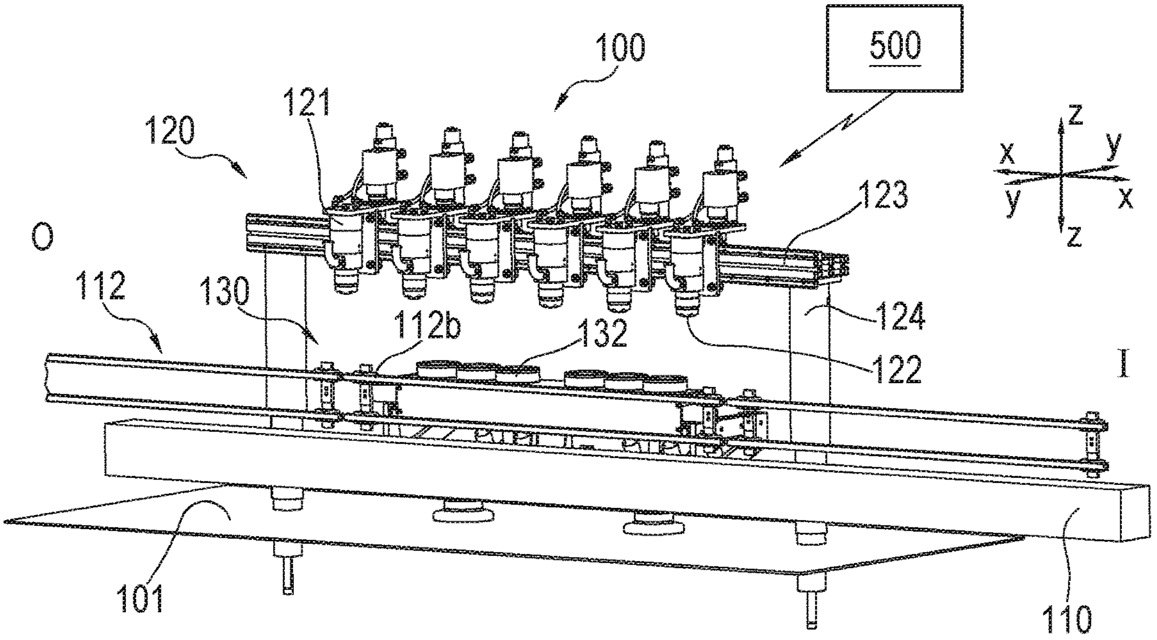

| | | | | |
|---|---|---|---|---|
| 2003/0213528 | A1* | 11/2003 | Ronchi | B67C 3/208 141/145 |
| 2010/0175784 | A1* | 7/2010 | Zanini | B67C 3/202 177/244 |
| 2017/0341919 | A1* | 11/2017 | Ramnarain | B65B 3/12 |
| 2020/0156916 | A1* | 5/2020 | Knott | B67C 3/007 |

* cited by examiner

APPARATUS AND METHOD FOR FILLING CONTAINERS ARRANGED IN-LINE WITH COLLECTION OF THE FLUIDS FOR WASHING THE SUPPLY DUCTS AND THE FILLING HEADS

The present invention relates to an apparatus for filling containers arranged in-line with an assembly for collection of the fluids for washing the supply ducts and the filling heads.

In the technical sector relating to the packaging of liquid and/or fluid products so-called filling apparatus are known, said apparatus being designed to introduce automatically a programmed quantity of product into single containers which are then capped and conveyed away for packaging in boxes.

It is also known that such apparatus generally consist of a carousel comprising a circular platform onto which the empty containers are fed, said containers being arranged at regular angular intervals so that, by imparting a rotational movement to the platform, said containers are arranged in a coaxial position underneath dispensing heads which are rotationally fixed and connected to ducts for supplying the product to be packaged.

Since said products are obtained from basic formulations containing suitable specific additives for the particular function of the finished product, there exists the need to carry out complete washing of the filling apparatus whenever a change in product must be performed.

In the prior art these washing operations are performed by supplying a washing liquid to the said ducts supplying the product to be inserted in the containers; the washing liquid is expelled from the discharge nozzles or mouths of the filling heads and collected by suitable trays movable from a rest position radially on the outside of the circumference of the container support rings to a working position radially on the inside of this circumference and situated below a plurality of nozzles.

Although performing their function, these rotating apparatus have the drawback that the containers are moved and filled individually and that changing the filling product is a slow and difficult operation in view of the mechanism for collecting the washing fluid. A further problem consists in the fact that any change in format for filling containers with a different shape or size is complex in particular as regards the container filling and movement devices which must be replaced or modified.

The technical problem which is posed is therefore that of providing an apparatus for filling containers with fluid products which solves or at least reduces the aforementioned problems of the prior art, being in particular able to achieve a greater versatility and rapidity of washing following changing of the filling fluid and/or a change of format for filling containers with a different shape or size.

In connection with this problem, it is also required that this apparatus should have small dimensions, be easy and inexpensive to produce and assemble and be able to be easily installed also on ready existing machines, without the need for special adaptation, and that it should be able to reduce the machine downtime due to washing thereof.

These results are obtained according to the present invention by a filling apparatus according to the characteristic features as described and claimed herein.

The present invention relates furthermore to a method for filling containers, a method for washing the apparatus and a process for changing the format of a filling apparatus as described and claimed herein.

One aspect of the present invention relates to an assembly for collecting washing fluids for a container filling apparatus, comprising a plurality of cups for collecting washing fluids, each being designed to be coupled with a respective filling head for collection of a fluid for washing the filling head and/or supply ducts of the filling head; the collection cups are arranged in-line in a longitudinal direction and are movable in a transverse direction between an inner position and an outer collection position, in which each cup is arranged in a position coaxial with a respective dispensing nozzle of the respective filling head, for coupling with the said dispensing nozzle.

Advantageously, the collection assembly may further comprise a section of a vertical shoulder for transversely retaining containers to be filled, extending in the longitudinal direction and displaceable in the transverse direction integrally with the collection cups.

Figure 2:
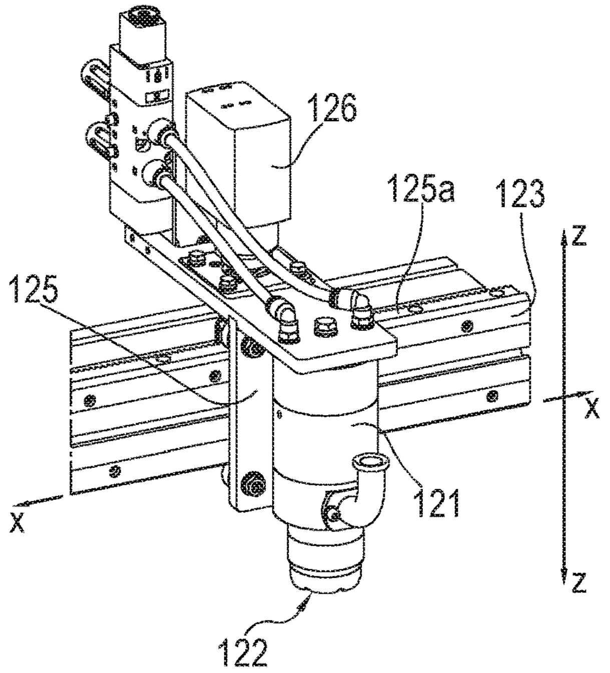
Figure 3:
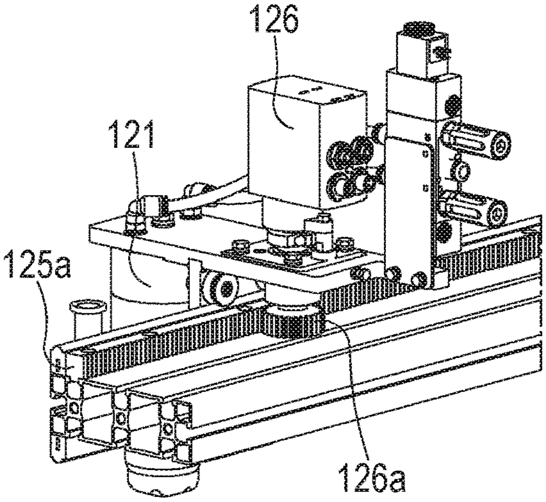
Figure 4:
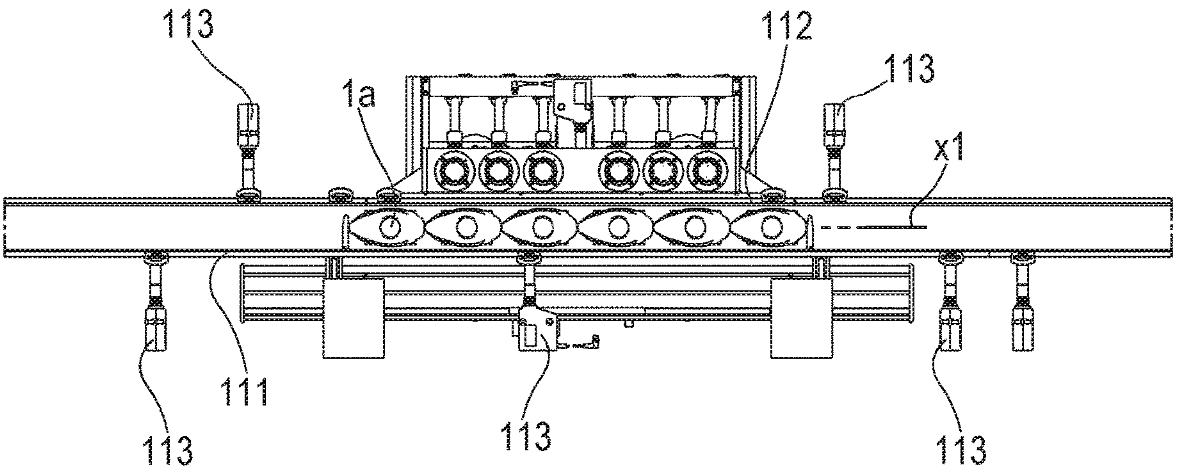
Figure 5:
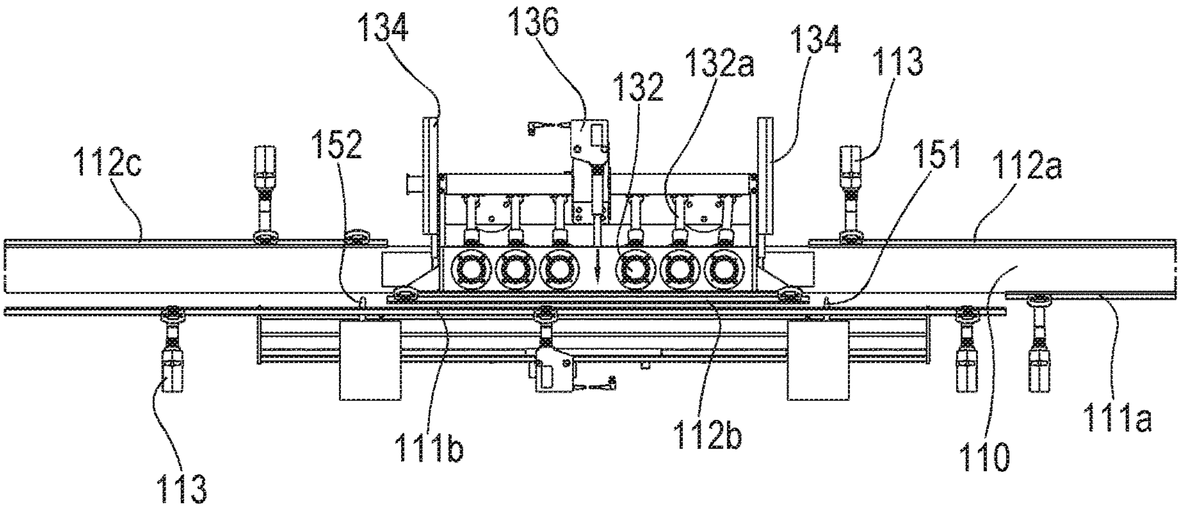
Figure 10:
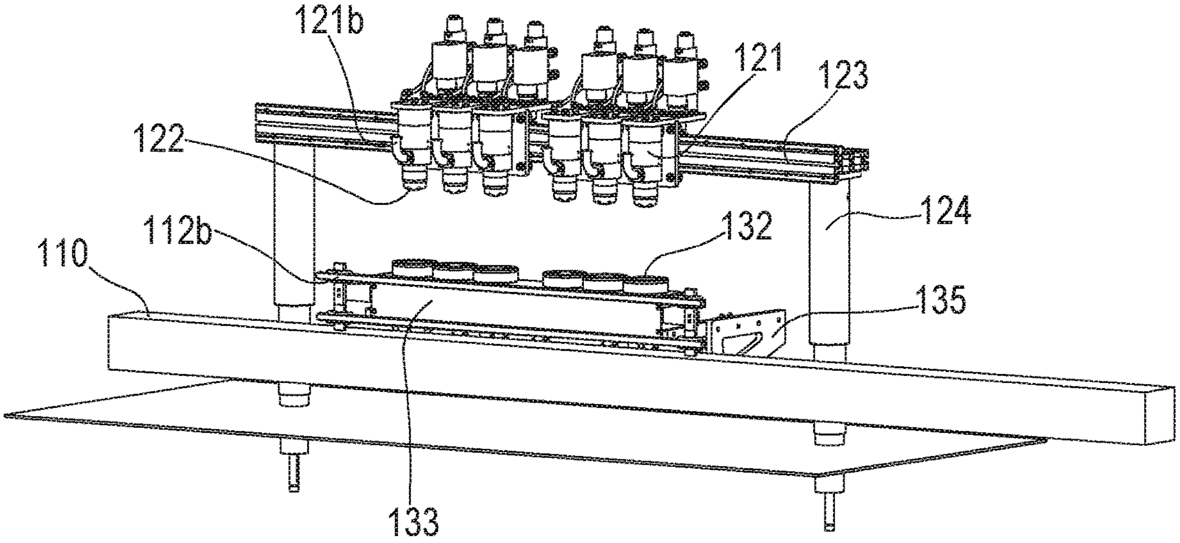
Figure 11:
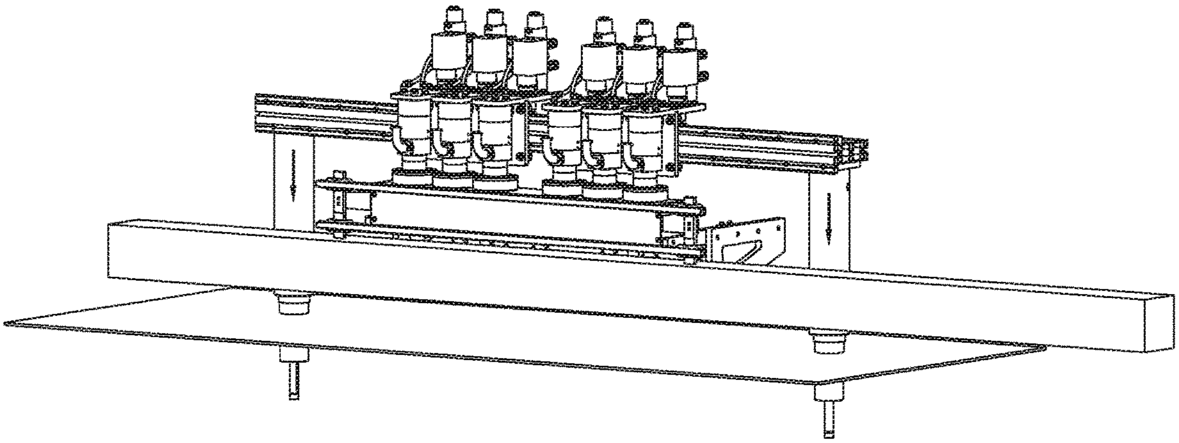

Further details may be obtained from the following description of a non-limiting example of embodiment of the subject of the present invention provided with reference to the attached drawings in which:

FIG. 1: shows a simplified, schematic, perspective view of the filling apparatus according to the present invention;

FIG. 2: shows a front perspective view of a filling head of the apparatus according to FIG. 1;

FIG. 3: shows a rear perspective view of a filling head of the apparatus according to FIG. 1;

FIG. 4: shows a partial schematic plan view of the filling apparatus of the present invention in a filling configuration;

FIG. 5: shows a partial schematic plan view of the filling apparatus of the present invention in a washing configuration;

FIGS. 6-9: show schematic perspective views of the filling apparatus according to FIG. 1 during different stages of the filling cycle;

FIGS. 10-11: show schematic perspective views of the filling apparatus according to FIG. 1 during different stages of the washing cycle;

As shown in FIGS. 1-9 and assuming solely for easier description and without a limiting meaning a set of three axes, i.e. a longitudinal axis x-x, parallel to a direction of advancing movement of the containers from upstream to downstream; a transverse direction y-y, parallel to a widthwise direction of a plane for transport and movement of the collection cups; and a vertical direction z-z, orthogonal to the first two axes and parallel to the direction of raising/lowering movement of the dispensing heads, an example of a filling apparatus 100 according to the present invention comprises a fixed base (only schematically shown) and a transport plane 110 for transporting a plurality of containers 1 arranged in-line in a longitudinal direction of advancing movement, from an upstream inlet I to a filling position in a filling station 120 and to a downstream outlet O.

For simpler description, some elements described below are shown only in some of the different views of FIGS. 1-9 and/or only partially or schematically. As can be seen, the filling station 120 has a plurality of filling heads 121 arranged in-line in the longitudinal direction and movable in the vertical direction z-z with respect to a transport plane 110 between a raised disengaged position (FIGS. 1,6-7), where they do not interfere with the transit of the containers to be filled, and a lowered bottom end end-of-travel position.

With reference to FIGS. 1-3, the plurality of filling heads 121 are in particular arranged in-line on a horizontal longitudinal guide 123 mounted on two vertical support uprights 124.

In greater detail, in the preferred example shown, the longitudinal guide 123 may be displaced in the vertical direction z-z by means of an associated drive assembly (not shown), for example comprising an electric drive which operates the uprights 124 so as to raise and lower the longitudinal guide 123 in the vertical direction. In particular, the uprights 124 may be mounted on respective vertical-axis endless screws or recirculating ball screws, which are operated by the drive assembly via an associated kinematic chain, so that the rotation in one direction or another of an output shaft of the electric drive causes a corresponding rotation of the recirculating ball screws and therefore a displacement in one direction or the other in the vertical direction of the uprights 124 carrying the longitudinal guide 123 to a different height in the vertical direction Z-Z.

The lowered position 121, in the vertical direction, of the filling heads may therefore be advantageously adjusted to a desired height, as will become clearer below.

With particular reference to FIGS. 2 and 3, each filling head 121 is also preferably movable independently of the other filling heads 121 in the longitudinal direction x-x, in particular along the longitudinal guide 123.

For this purpose, in the preferred example shown, each filling head 121 is mounted on a sliding element 125 which slides along the longitudinal guide 123, upon operation of a respective drive assembly, for example comprising an actuator, in particular an electric motor 126, the shaft of which is arranged parallel to the vertical direction z-z and which carries a pinion **126*a* which meshes with a linear rack 125*a* fixed to the longitudinal guide 123**.

Figure 7:
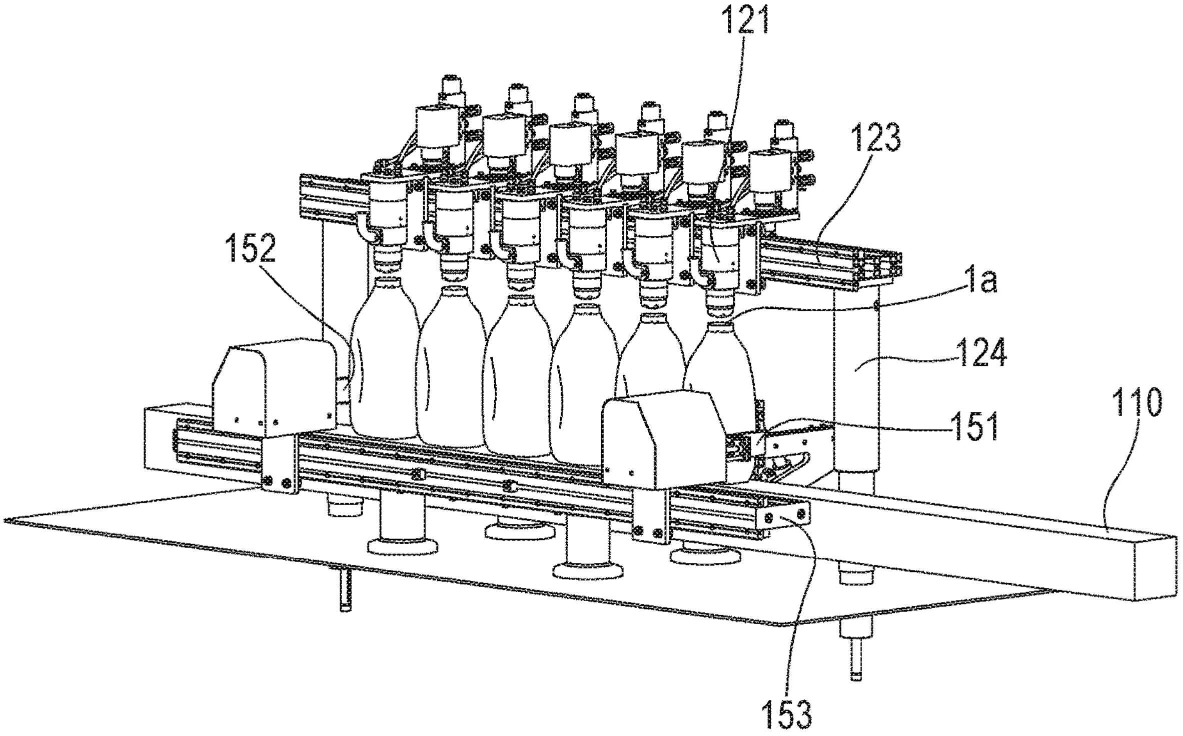
Figure 8:
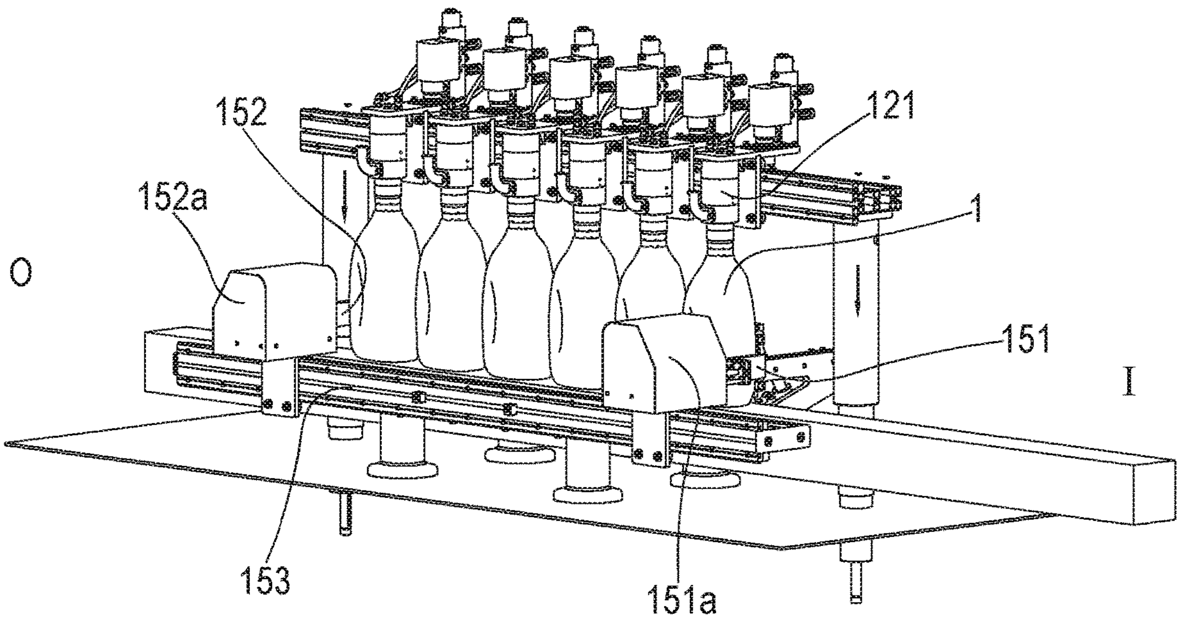

Therefore, a position in the longitudinal direction of each filling head 121, in particular a relative distance between the filling heads 121, may be easily adjusted, so as to arrange the heads in a desired filling position in coaxial alignment with the mouth **1*a* of a respective container 1 arranged in the filling station 120 (FIGS. 7-8**).

The filling heads 121 are therefore for example configured and able to be controlled so as to arrange the dispensing nozzles 122 at a desired uniform distance (interval) in the longitudinal direction, corresponding to an interval between the mouths **1*a* of the batch of containers 1 to be filled, with which they are aligned in the filling position; upon variation in the format of the container, the relative position of the filling heads 121** may be easily adapted, thereby facilitating greatly a format changing operation.

The transport plane 110 extends lengthwise parallel to the longitudinal direction x-x and widthwise parallel to the transverse direction y-y and may for example be realized as a conveyor belt which is operated by an associated actuator with a suitable movement.

In particular, the transport plane 110 is operated so as to transport a series of containers 1 in the longitudinal direction x-x from the inlet I of the apparatus (FIG. 4) into a filling position (FIG. 5) in the filling station (FIG. 6) in which a batch comprising a predefined number of containers 1 is filled, each container being arranged with its filling mouth **1*a* in vertical alignment with a respective nozzle 122 of a filling head 121 and, once filling has been completed (FIG. 9**), from the filling station towards the outlet O or towards following downstream stations.

Figure 6:
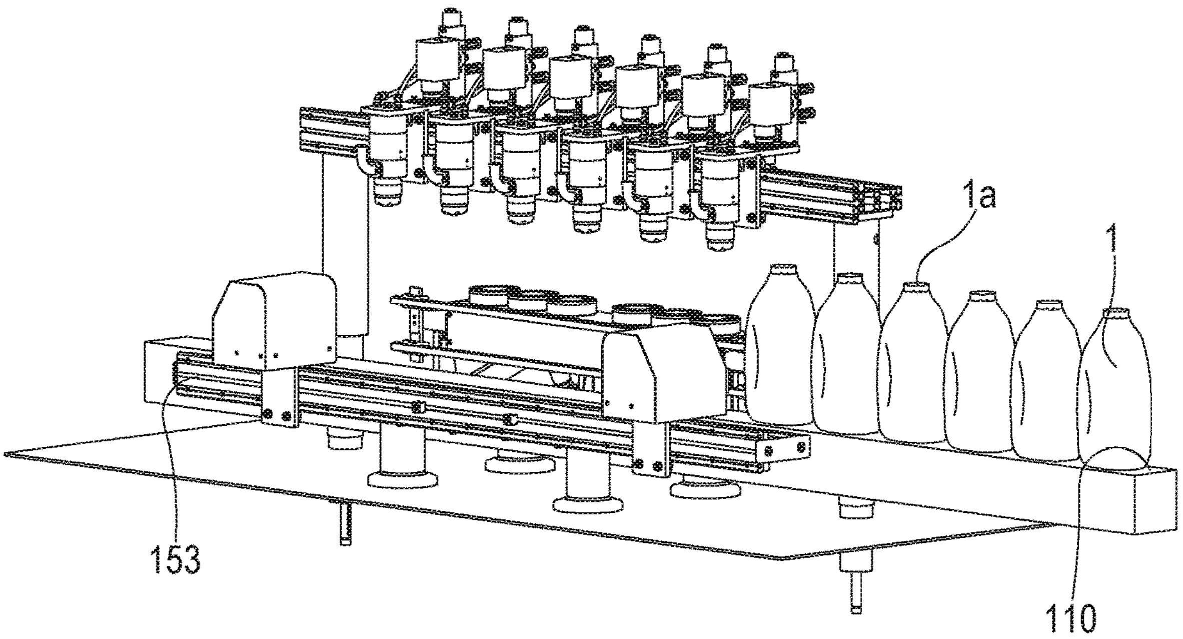

With reference to FIGS. 4-6, the following are preferably arranged at the filling station:

- a rear stop assembly, comprising a stop 151 movable between a retracted position, where it does not interfere with the transit of the containers on the transport plane 110, and a position extending inwardly in the transverse direction, where the stop is arranged above the transport plane 110 so as to separate the last end container 1 in the batch of containers to be filled from the following containers being fed;
- a front stop assembly, comprising a stop 152 movable between a retracted position, where it does not interfere with the transit of the containers on the transport surface 110, and a position extending inwardly in the transverse direction, where the stop 152 is arranged above the transport plane 110 so as to stop the feeding of a downstream container 1 of the batch of containers to be filled, in a predefined filling position in the longitudinal direction x-x.

The front stop is preferably arranged in an outer position in the direction traverse to the transport plane 110 and downstream of a first filling head 121 (close to the outlet O).

The rear stop is preferably arranged in an outer position in the direction transverse to the transport plane 110 and at the rear, in the longitudinal direction, of a last filling head 121 (close to the inlet I).

Each stop 151,152 is for example in the form of a tongue movable rotationally about a vertical axis between said two positions, i.e. retracted (open) position and (closed) position extending in the transverse direction, upon operation of a respective actuator, for example an electric drive.

Preferably, the rear stop is configured so as to rotate into the open position against the action of resilient means, when pushed by a container which advances in the longitudinal direction fed by the transport plane 110; the resilient means, for example in the form of one or more springs, are in particular arranged so as to push the rear stop 152 towards the extended closed position. The elasticity, during opening, of the rear stop allows any damage to be avoided when the stop comes into contact with a bottle.

Preferably, the front stop 152 is initially rotated into the closed position so as to stop the advancing containers 1 and will be opened, once filling of the entire batch has been completed, so as to allow the advancing movement of the filled bottles.

According to a preferred embodiment, it is possible to stagger the opening/closing of the front stop 151 and rear stop 152 with respect to each other, in order to obtain separation of the batch of consecutive containers fed in series to the filling station 120.

In particular, it is possible to delay the opening of the rear stop with respect to the opening of the front stop 151, following a filling cycle, in order to separate the batch of filled containers advancing towards the outlet O from the following containers which enter into the filling station 120.

The position, in the longitudinal direction x-x, of the front stop 152 and/or of the rear stop 151 is preferably adjustable depending on the different formats of containers 1 to be filled; in particular each stop 151,152 may be displaceable on a longitudinal guide 153 which is fixed with respect to the transport plane, by means of a respective drive unit **152*a*, 151*a***.

Advantageously, in the presence at least of the front stop 151, it is not necessary to stop the conveyor belt 110 during the filling of the containers.

According to preferred embodiments, the transport plane 110 may be operated so as to advance (if necessary without ever stopping) also during the period of filling, in the filling station, of the containers 1 which are kept in position by the front stop 151. This proves to be advantageous, for example, in order to convey the already filled containers of a batch output from the filling station 120 towards downstream apparatus (such as a capping apparatus) also during filling of the following batch and using the same transport plane for feeding the containers to the inlet and extracting them from the outlet.

With reference to FIGS. 1 and 4-5, according to preferred embodiments, vertical side shoulders 111,112 are provided, respectively on the inside and outside in the transverse direction, said shoulders extending parallel to the longitudinal direction x-x of advancement of the containers 1 and being designed to delimit transversely a corridor situated above the transport plane 110, for containing and guiding the containers 1, in order to reduce the risk of the containers falling/being overturned during their advancing movement and/or during filling in the filling station 120.

In greater detail with reference to FIGS. 4 and 5:

a first shoulder 111 is arranged on a first side of the transport plane 110 (conventionally assumed as being the outer side in the transverse direction) and is preferably movable in the transverse direction y-y between an outer position and an inner position of maximum superimposition on the transport plane;

a second shoulder 112 is arranged on an opposite side of the transport plane 110 (conventionally assumed as being the inner side in the transverse direction) and is movable in both senses of the transverse direction Y-Y; in detail the second shoulder 112 is movable between an inner position (FIG. 4) and an outer position (FIG. 5) fully towards the opposite first shoulder 111.

Therefore, by adjusting the relative distance between the first outer shoulder 111 and the second inner shoulder 112, it is possible to adjust a transverse width of the transit corridor of the containers 1 on the transport plane 110, depending on the transverse dimension of the said container.

Preferably, in order to define the dimensions of the transit corridor, the two shoulders 111,112 are movable in the transverse direction symmetrically with respect to a predefined longitudinal axis x1 (FIG. 4) of alignment of the container mouths 1*a*. In this way, the mouth of the containers 1 may be kept always in the same transverse filling position for coaxial alignment with the respective filling head 121, which does not need to be moved transversely when there is a variation of the container 1 and/or of the transit corridor.

The transverse movement of the shoulders 111,112 may be for example performed by a plurality of actuators, in particular linear actuators 113.

As shown in FIGS. 4 and 5, in preferred embodiments, the inner shoulder 112 may be formed by a plurality of longitudinal shoulder sections 112*a*, 112*b*, 112*c*, which include in particular at least one section 112*b* arranged inside the filling station and displaceable in the transverse direction y-y, independently of the other shoulder sections 112*a*, 112*b*, in particular into a position beyond the transport plane 110, such as to allow the displacement, in the same direction, of cups 132 for collecting the washing fluids (described more fully below) so as to bring them into a position coaxial with the filling mouths 122 during washing of the latter.

The outer shoulder 113 may preferably be in turn formed by a plurality of longitudinal shoulder sections 111*a*, 111*b*, which include in particular at least one section 111*b* arranged at least partly inside the filling station and displaceable in the transverse direction y-y independently of the other shoulder sections 111*a*, in particular into a position removed from the transport plane 110, designed to allow the displacement of the inner shoulder section 112*b* of the filling station into said position beyond the transport plane for washing.

With reference to FIGS. 1 and 4-5, an advantageous aspect of the invention relates to an assembly 130 for collecting the washing fluids, arranged in the filling station 120 and comprising a number of cups 132 for collecting the fluids for washing the supply ducts of the filling heads 121, equal to the number of said filling heads.

The cups 132 are arranged in-line in the longitudinal direction x-x and are movable in the transverse direction y-y with respect to the transport plane 110 between an inner position (FIGS. 1 and 4), in which they do not interfere with the transit of the containers 1 on the transport plane and the movement in the vertical direction of the filling heads 121, and an outer collection position (FIGS. 5, 11), in which each cup 132 is arranged above the transport plane 110 in a position coaxial with the respective dispensing mouth 122 of a respective filling heads 121, for coupling (preferably in a sealed manner) with the said mouth.

A respective duct 132*a* for collecting the washing fluids is associated with each cup 132.

As shown in FIGS. 1, 8, 10 and 11, the collection cups 132 are preferably mounted on a longitudinal support 133 on which they are longitudinally aligned in a predefined relative position.

The longitudinal support 133 is movable in the transverse direction y-y on transverse guides by means of an actuating unit 136, in the example comprising a linear actuator.

In greater detail, the collection assembly 130 is mounted on a flange 135 which is fixed with respect to the base 101 and which carries said transverse guides 134. An actuating arm 136*a* of the actuator 136 extends in the transverse direction y-y and the actuator is arranged and configured so that, by extracting the arm 136*a* in the transverse direction, the longitudinal support 133 is moved from/towards the transport plane 110, simultaneously bringing the cups 132 towards the outer washing position/inner disengaging position.

Preferably, the plurality of cups 132 is arranged divided into two series of cups, i.e. upstream cups and downstream cups, and the actuating unit, in particular the transverse arm 136*a*, is arranged in the longitudinal direction x-x between the series of upstream cups and the series of downstream cups. It will be clear to the person skilled in the art that other different configurations of the actuating unit for displacing the support and the cups 132 are possible.

According to one advantageous aspect, one section 112*b* of the inner shoulder 112 arranged in the filling station is locked displaceably in the direction transverse to the washing cups 132 so that, by displacing the collection cups 132, the inner shoulder section 112*b* (usually situated between them and the transport plane 110) is displaced in a coordinated manner into an outer position (FIG. 5) in which it allows the cups 132 to be arranged above the transport plane, coaxially aligned in the vertical direction with the filling heads 121. In particular, as can be seen for example in FIGS. 1, and 11, the inner shoulder section 112*b* may be mounted on the longitudinal cup-holder support 133, preferably fixed to a side of the support in a front position, facing, during use, the transport plane and the opposite outer shoulder 111.

With this configuration, the displacement of the shoulder section 112*b* of the filling station may be performed by means of the actuating unit 136 of the said cups, achieving in a simple manner also the necessary coordination between the movement in the transverse direction of the shoulder 112*b* and that of the cups 132, for switching between a filling configuration and a configuration for washing the apparatus.

As shown in FIGS. 6-9 and 10-11, the travel movement of the guide 123 and therefore of the filling heads 121 in the vertical direction z-z may be adjusted so that in the lowered position the said heads are arranged at a desired height, which may be a filling height (FIG. 6), adjusted depending on the height of the container to be filled, in which a respective dispensing nozzle 122 is coaxially coupled with a filling mouth 1*a* of the respective container 1, or a washing height (FIG. 9), predefined on the basis of a height in the vertical direction of the collection cups 132, such that the respective dispensing nozzle 122 is coaxially coupled with a respective cup 132 for collecting the washing fluid.

The filling heads 121 are also configured and can be controlled so as to be arranged in a predefined relative position in the longitudinal direction for washing, corresponding to a predefined relative arrangement of the washing cups with which they are vertically aligned for washing; in the preferred example, this arrangement involves two series of filling heads, i.e. upstream filling heads and downstream filling heads, with an arrangement corresponding to the series of collection cups 132.

Although it is possible to envisage moving in the longitudinal direction also the single collection cups 132, it is in fact preferable for these cups to be arranged fixed in a predefined position, in order to simplify the structure of the apparatus and exploit in a synergic manner the possibility of independently positioning the filling heads.

The apparatus may also comprise a unit 500 for processing and controlling the components and the operating systems of the apparatus, for example configured to adjust and control one or more, preferably all the following operations:

the position of the filling heads, the operation of the transport plane, the counting of the bottles in a batch (for example by means of an optical detection system), the quantity of product filled inside the bottles, the presence of bottles underneath the dispensing nozzle, the position of the bottle retaining shoulders.

Figure 9:
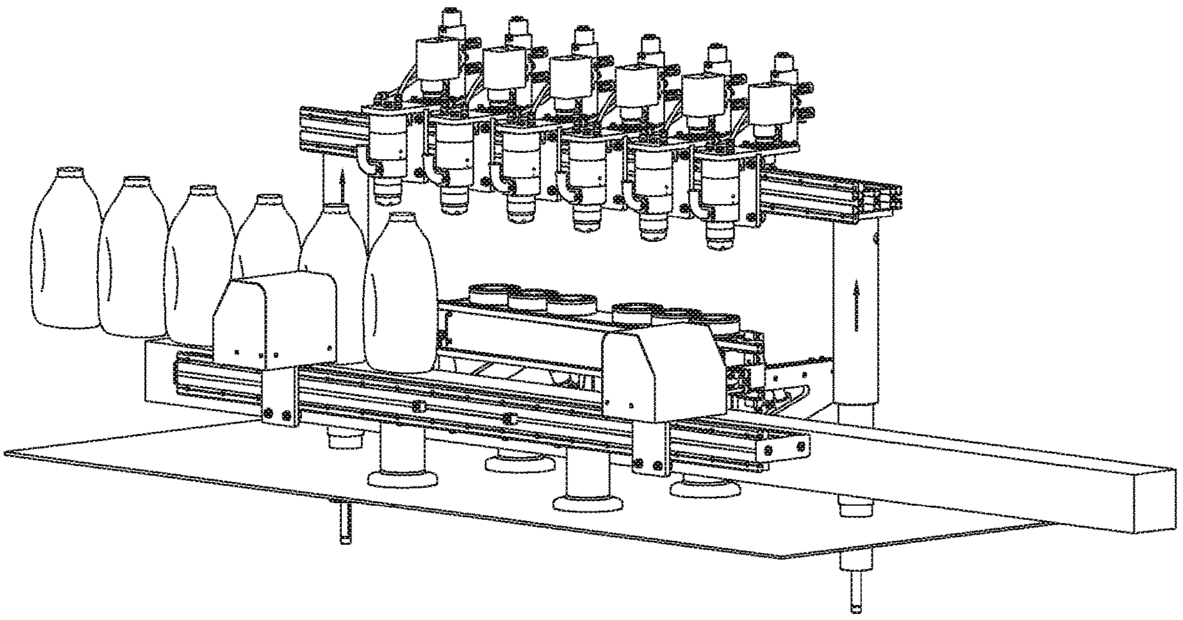

With this configuration and as schematically shown in FIGS. 6-9, the operation of the apparatus for implementing a preferred example of a filling cycle may be as follows:

after introduction of the containers 1 onto the conveyor belt 110, the outer and inner shoulders 111,112 (if present) are adjusted to a distance in a transverse direction such as to contain and guide the bottles;

the filling heads 121 are moved in the longitudinal direction x-x, defining an interval corresponding to the interval between the mouths 1*a* of the bottles to be filled (FIG. 6);

the collection cups 132 are kept in an internal position in the transverse direction y-y where they do not interfere with the transport plane 110;

the conveyor belt 110 is operated so as to allow the advancing movement of the containers 1, causing the opening of the rear stop 151 and the entry of the containers 1 into the filling station 120;

when the first bottle 1 reaches the front stop 152, arranged in the extended closed position, it stops and the following bottles 1 are arranged in the filling station forming the batch (FIGS. 4,7) comprising a predefined number of containers to be filled simultaneously;

the filling cycle is started, lowering the longitudinal guide 123 so as to couple each nozzle 122 of the filling heads 121 with a respective mouth 1*a* of a bottle 1 (FIG. 8);

controlled filling is started, supplying the filling fluid for example from a pressurised storage tank (not shown and conventional per se) through the supply ducts to the filling heads 121, until the necessary quantity of fluid is fully introduced inside each container 1 of the batch;

the longitudinal guide 123 is raised, bringing the heads 121 into the raised position where there is no interference with the bottles (FIG. 9);

the front stop 152 is released and the transport plane 110 is operated, resuming the advancing movement, in the longitudinal direction, of the bottles 1 (FIG. 9), which are conveyed towards the outlet O and the following downstream operations.

Once all the bottles provided have been filled, or if a change of the filling product is required, a cycle for washing the supply ducts and the filling heads 121 may be performed; a preferred example of this washing cycle may involve the following steps:

if necessary, positioning the filling heads in the predefined washing arrangement in the longitudinal direction x-x, corresponding to a predefined relative position of the collection cups 132 (FIG. 10);

if present, displacement, in the transverse direction, of the outer shoulder 111*b* of the filling station into the position removed from the transport plane (FIG. 5);

displacement, in the transverse direction, of the longitudinal support 133 so as to bring the inner shoulder section 112*b* coupled therewith into the position beyond the plane 110, close to the outer shoulder 111*b*, and each cup 122 into a position coaxial with a respective filling nozzle 122 of a filling head (FIGS. 5, 10);

displacement, in the vertical direction, of the longitudinal guide 123, with displacement of the filling heads 121 to a desired height so as to couple each nozzle 122 of a head 121 with a respective collection cup 132 (FIG. 11);

the start of timed washing during which the washing fluid (supplied for example from the same pressurised storage tank or other supply source) is supplied to the supply ducts 121*b*, passes through the filling heads 121 and from these is discharged into the collection cups 132 where it is collected and evacuated by means of the ducts 132*a;* at the end of washing the longitudinal guide 123 is raised again so that the filling heads are disengaged from the cups and, being displaced in the transverse direction, the cups 132 are brought into the inner disengagement position (FIG. 1), where they do not interfere with the advancing movement of the bottles;

the apparatus is ready for a new filling cycle with different bottles and/or a different fluid to be introduced inside them.

It is therefore clear how the apparatus according to the invention is able to achieve the batch filling of containers with different filling fluids and perform rapid and leakage-free pressurised washing of the product supply parts.

In addition, the apparatus may be easily adapted to containers, such as bottles of pharmaceutical or cosmetic products, of varying format, for

The invention claimed is:

1. An apparatus for filling containers, comprising:

a filling station, comprising a plurality of filling heads which are supplied by supply ducts for supplying a filling fluid and are each provided with a dispensing nozzle;

a transport plane for transporting a plurality of containers arranged in-line along a longitudinal feeding direction (x-x), from an upstream inlet to a filling position in the filling station and to a downstream outlet;

wherein the filling heads are arranged in-line along the longitudinal direction (X-X) and are movable in a vertical direction (z-z) with respect to the transport plane between a raised position, where they do not interfere with passage of the containers to be filled, and a lowered position;

the apparatus further comprising a collector assembly for collecting washing fluids, comprising a number of collection cups for collecting washing fluids for washing the filling heads and/or the supply ducts, equal to the number of said filling heads; the collection cups being arranged in-line along the longitudinal direction (x-x) and being movable in a transverse direction (y-y) with respect to the transport plane between an inner position, where they do not interfere with the transit of the containers on the transport plane and the movement of the filling heads in the vertical direction, and an outer collection position, where each cup is arranged above the transport plane in a position coaxial with a respective dispensing nozzle of a respective filling head, for coupling with the said dispensing nozzle.

2. The apparatus according to claim 1, wherein the filling heads are arranged in-line on a longitudinal guide mounted on vertical support uprights.

3. The apparatus according to claim 1, wherein each filling head is movable independently of the other filling heads in the longitudinal direction (x-x).

4. The apparatus according to the claim 3, wherein each filling head is mounted on a sliding element which slides along a longitudinal guide, upon operation of a respective drive assembly.

5. The apparatus according to the claim 4, wherein the drive assembly comprises an electric motor actuator, preferably an electric motor, the shaft of which is arranged parallel to the vertical direction (z-z) and carries a pinion which meshes with a linear rack fixed to the longitudinal guide.

6. The apparatus according to claim 1, wherein a position in the longitudinal direction of each filling head is adjustable to arrange the filling heads in a predefined relative position.

7. The apparatus according to the claim 6, wherein the predefined relative position is a filling position such as to cause a coaxial alignment of each dispensing nozzle with the mouth of a respective container arranged in the filling station, and/or a washing position, corresponding to a predefined relative position of the collection cups, such as to cause a coaxial alignment of each dispensing nozzle with the respective collection cup.

8. The apparatus according to the claim 7, wherein, in the filling position, the dispensing nozzles are arranged at a uniform distance in the longitudinal direction, corresponding to an interval between the mouths of a batch of containers to be filled; and/or in that, in the washing position, the filling heads are arranged as at least two separate series of filling heads spaced by a uniform interval.

9. The apparatus according to claim 1, wherein the transport plane is operated so as to transport a series of containers in the longitudinal direction (x-x) from the inlet of the apparatus to a filling position in the filling station, where a batch comprising a predefined number of containers are arranged each with the respective filling mouth aligned coaxially with one of the dispensing nozzles of the filling heads and, once filling has been completed, from the filling station towards the downstream outlet.

10. The apparatus according to claim 1, wherein the following are arranged in the filling station:

a rear stop, movable between a retracted position, where it does not interfere with transit of the containers on the transport plane, and a position extending inwardly in the transverse direction, where the stop is arranged above the transport plane; and/or a front stop, movable between a retracted position, where it does not interfere with transit of the containers on the transport plane, and a position extending inwardly in the transverse direction, where the stop is arranged above the transport plane so as to stop the advancement of a downstream container of a batch of containers to be filled.

11. The apparatus according to claim 10, wherein each stop is in the form of a tongue rotationally movable about a vertical axis between said two positions retracted and extended in the transverse direction, and/or in that the rear stop is configured to rotate into the open position against the action of resilient means, when pushed by a container fed by the transport plane.

12. The apparatus according to claim 10, wherein the position in the longitudinal direction (x-x) of the front stop and/or of the rear stop is adjustable depending on the format of the container; wherein preferably each stop is displaceable on a longitudinal guide fixed with respect to the transport plane, by means of a respective drive unit.

13. The apparatus according to claim 1, wherein it comprises an inner vertical shoulder, arranged on a first side of the transport plane in the transverse direction (y-y), and an outer vertical shoulder, arranged on an opposite side of the transport plane, the shoulders extending parallel to the longitudinal direction (x-x) of advancement of the containers and being designed to delimit transversely a corridor for transit of the containers situated above the transport plane.

14. The apparatus according to claim 13, wherein the outer shoulder is movable in the transverse direction (y-y) between an outer position and an inner position of maximum superimposition over the transport plane, and/or wherein the inner shoulder is movable in both senses of the transverse direction (y-y), between an inner position and an outer position, so that by adjusting a relative distance between the outer shoulder and the inner shoulder it is possible to adjust a transverse width of the corridor for transit of the containers on the transport plane.

15. The apparatus according to the claim 14, wherein the two shoulders are movable in the transverse direction symmetrically with respect to a predefined longitudinal axis (x1) of alignment of the mouths of the containers.

16. The apparatus according to claim 13, wherein the inner shoulder is formed by a plurality of longitudinal shoulder sections, which include at least one section arranged inside the filling station and displaceable in the transverse direction (y-y) independently of the other shoulder sections into an outer position such as to allow the transverse displacement of the collection cups into the position coaxially aligned with the respective dispensing nozzles of the filling heads.

17. The apparatus according to claim 13, wherein the outer shoulder is formed by a plurality of longitudinal sections which include at least one section arranged at least partly inside the filling station and displaceable in the transverse direction (y-y) independently of the other shoulder sections.

18. The apparatus according to claim 1, wherein the collection cups are mounted on a longitudinal support on which they are arranged longitudinally aligned in a predefined relative position.

19. The apparatus according to claim 18, wherein the longitudinal support is movable in the transverse direction (y-y) on transverse guides by means of an actuating unit.

20. The apparatus according to claim 19, wherein an actuating arm of the actuating unit extends in the transverse direction.

21. The apparatus according to claim 1, wherein the plurality of collection cups are arranged divided up into at least two series of cups, being a series of upstream cups and a series of downstream cups, wherein a transverse arm of a unit for displacing the cups is arranged in the longitudinal direction (x-x) between the series of upstream cups and the series of downstream cups.

22. The apparatus according to claim 1, wherein one section of a vertical shoulder for containing the bottles is locked displaceably in the transverse direction together with the collection cups.

23. The apparatus according to claim 22, wherein the shoulder section is mounted on a longitudinal cup-holder support.

24. The apparatus according to claim 1, further comprising a unit for processing and controlling the components and the operation of the apparatus.

25. A method for filling a plurality of containers by means of an apparatus according to claim 1, comprising the steps of:

positioning the collection cups in an inner position in the transverse direction (y-y) of non-interference with the transport plane;

positioning the filling heads in a raised position with respect to the transport plane in the vertical direction (z-z);

transporting on the transport plane a plurality of containers arranged in-line along a longitudinal feeding direction (x-x), from the upstream inlet (I) to a filling position in the filling station;

moving the filling heads in the vertical direction (z-z) from the raised position into the lowered position with respect to the transport plane, so as to couple each dispensing nozzle with a respective mouth of a container;

supplying a filling fluid to the filling heads via the ducts for supplying and dispensing the fluid inside the containers by means of the dispensing nozzles, until each container is filled with a predefined quantity of fluid;

raising the filling heads in the vertical direction (z-z) into the raised position where they do not interfere with the transit of the containers;

operating the transport plane with advancement of the containers towards the outlet (O).

26. The method according to claim 25, further comprising moving the filling heads in the longitudinal direction (x-x), so as to position them in a relative filling position, defining an interval between filling heads corresponding to an interval between the mouths of the containers to be filled.

27. A method for washing the supply ducts and the filling heads of a filling apparatus according to claim 1, comprising the steps of:

moving the collection cups in the transverse direction with respect to the transport plane between the inner position, where they do not interfere with the transit of the containers on the transport plane and the movement of the filling heads in the vertical direction, and the outer collection position, positioning each cup above the transport plane in a position coaxial with a respective dispensing nozzle of a respective filling head, moving each filling head in the vertical direction from the raised position into the lowered position with respect to the transport plane, so as to couple each dispensing nozzle with a respective collection cup;

supplying a washing fluid through the supply ducts to each filling head and discharging the washing fluid by means of the respective dispensing nozzles;

collecting the washing fluid discharged from the dispensing nozzles by means of the respective collection cups coupled with the dispensing nozzles;

raising the filling heads in the vertical direction (z-z) into the raised position;

moving the collection cups in the transverse direction (y-y) with respect to the transport plane from the outer collection position into the inner position, where they do not interfere with the transport plane and the movement in the vertical direction of the filling heads.

28. A process for changing format and/or changing the filling fluid in an apparatus according to claim 1, comprising one or more of the following operations:

washing the supply ducts and the filling heads, comprising the steps of:

moving the collection cups in the transverse direction (y-y) with respect to the transport plane between the inner position, where they do not interfere with the transit of the containers on the transport plane and the movement of the filling heads in the vertical direction, and the outer collection position, positioning each cup above the transport plane in a position coaxial with a respective dispensing nozzle of a respective filling head, moving each filling head in the vertical direction (z-z) from the raised position into the lowered position with respect to the transport plane, so as to couple each dispensing nozzle with a respective collection cup, supplying a washing fluid through the supply ducts to each filling head and discharging the washing fluid by means of the respective dispensing nozzles, collecting the washing fluid discharged from the dispensing nozzles by means of the respective collection cups coupled with the dispensing nozzles, raising the filling heads in the vertical direction (z-z) into the raised position, and moving the collection cups in the transverse direction (y-y) with respect to the transport plane from the outer collection position into the inner position, where they do not interfere with the transport plane and the movement in the vertical direction of the filling heads;

positioning the filling heads in a different relative position in the longitudinal direction; and setting a different height in the lowered bottom end-of-travel position for movement of the filling heads in the vertical direction.

* * * * *